United States Patent [19]

Porat et al.

[11] 4,367,990
[45] Jan. 11, 1983

[54] CUTTING INSERT

[75] Inventors: Reuven Porat, Nahriya; Elizer Nessel, Haifa, both of Israel

[73] Assignee: Iscar Ltd., Nahariya, Israel

[21] Appl. No.: 168,904

[22] Filed: Jul. 14, 1980

[30] Foreign Application Priority Data

Aug. 8, 1979 [IL] Israel .................................... 58006

[51] Int. Cl.³ ............................................ B26D 1/00
[52] U.S. Cl. .................................... 407/114; 407/115
[58] Field of Search ................ 407/114, 113, 115, 116

[56] References Cited

U.S. PATENT DOCUMENTS

| 3,487,515 | 1/1970 | Contrucci | 407/114 |
|---|---|---|---|
| 3,557,416 | 1/1971 | Jones | 407/114 |
| 3,866,282 | 2/1975 | Lundgren | 407/113 |
| 3,882,580 | 5/1975 | Lundgren | 407/116 |
| 3,885,281 | 5/1975 | Stambler | 407/114 |
| 4,056,871 | 11/1977 | Bator | 407/114 |
| 4,087,193 | 5/1978 | Mundy | 407/114 |
| 4,218,160 | 8/1980 | Arnold | 407/114 |

Primary Examiner—Leonidas Vlachos
Attorney, Agent, or Firm—Ladas & Parry

[57] ABSTRACT

A cutting insert of the disposable kind and which can be used to provide positive rake cutting action when mounted in a negative rake tool holder and having a chip control structure comprising successive descending and chip deflector surfaces effective over a broad range of operational conditions namely a wide range of materials cutting depths and feed rates and such that along every radial section line directed centrally through and in the direction of a central portion of the insert no surface is directed upwardly with respect to a preceding surface while along every section line directed normally with respect to a cutting edge of the insert at least one deflector surface slopes upwardly with respect to or is substantially parallel to a base surface.

4 Claims, 9 Drawing Figures

Fig. 2
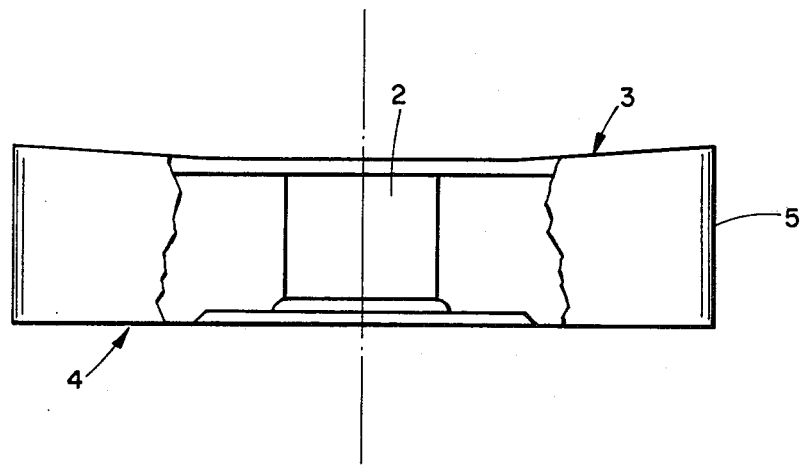
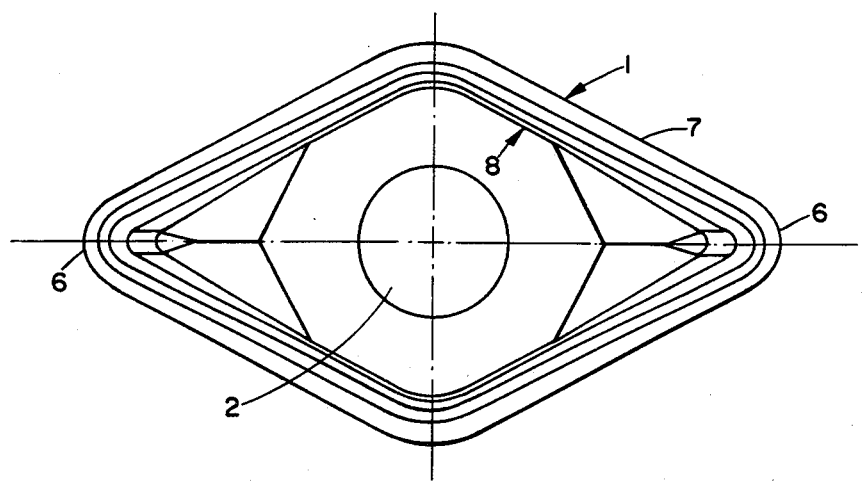
Fig. 1

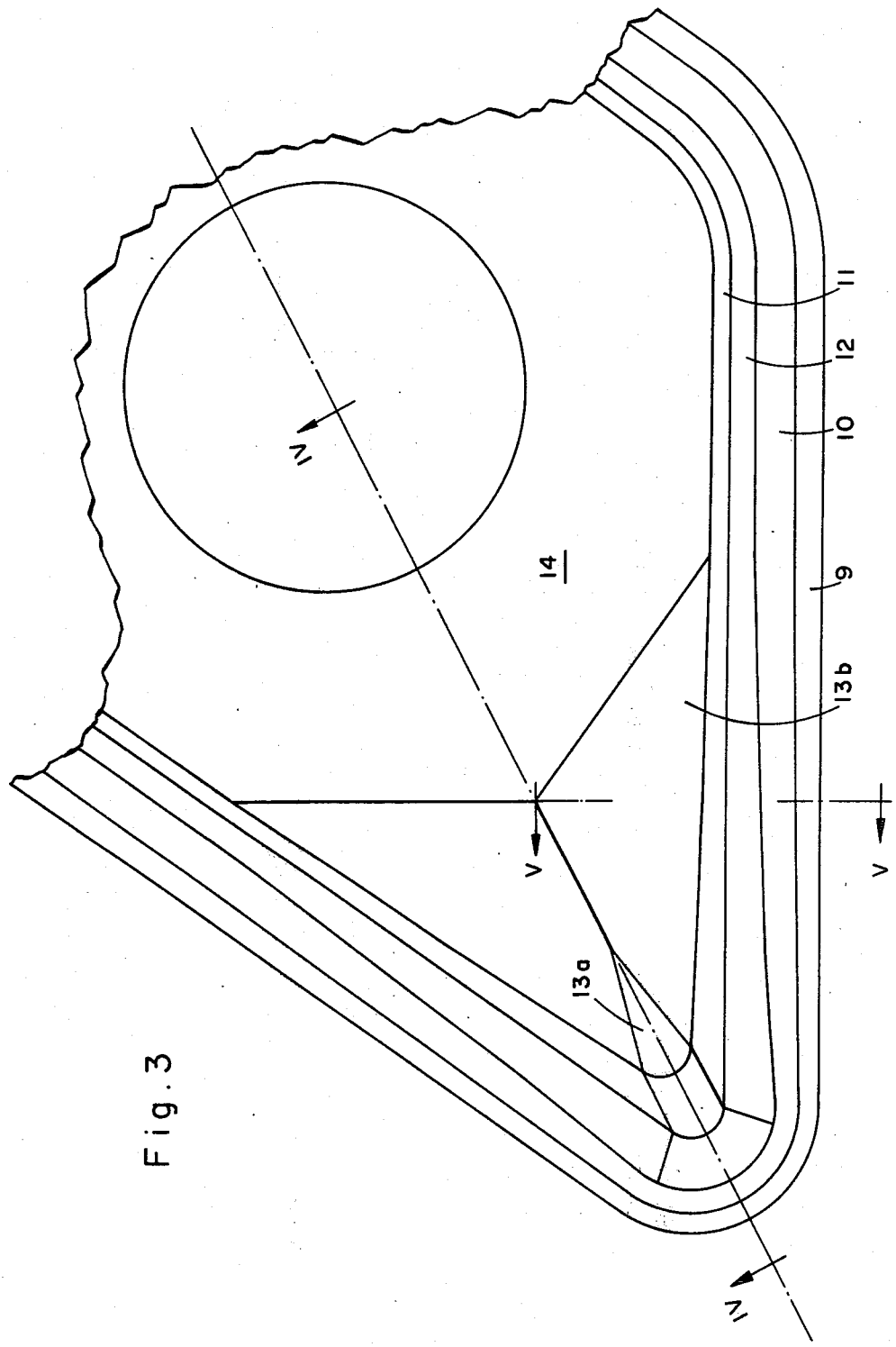

CUTTING INSERT

This invention relates to an improved cutting insert of the disposable kind and which can be used to provide positive rake cutting action when mounted in a negative rake tool holder.

It is an object of the present invention to provide such a disposable cutting insert with satisfactory chip control which is effective over a broad range of operational conditions namely a wide range of materials cutting depths and feed rates.

According to the present invention there is provided a disposable cutting insert having an upper and a substantially planar base face; side walls adjoining said faces; at least one cutting edge formed at an intersection of the upper face and a side wall; at least one cutting corner formed at an intersection of an adjacent pair of side walls; a chip control structure formed in said upper face extending along the cutting edge from the cutting corner for at least an effective cutting length of the cutting edge; a land surface spacing said control structure from the cutting edge; said control structure comprising first and second descending surfaces respectively extending in the direction of said cutting edge; a first chip deflector surface between said descending surfaces and merging therewith; one or more further chip deflector surfaces extending between said second descending surface and a central portion of said upper face; said land, descending and deflector surfaces having, in general, a substantially downwardly directed slope with respect to the base face in the direction of the cutting edge and from the cutting corner at least over said effective cutting length said land and first descending surfaces increasing in width from said cutting corner and at least along said effective cutting length; said first descending surface sloping with respect to said land surface by an angle which decreases from said cutting corner along said effective cutting length; said chip control structure constituting a stepped cavity of which said land surface is the rim and said central portion the base such that along every radial section line directed centrally through and in the direction of said central portion no surface is directed upwardly with respect to a preceding surface whilst along every section line directed normally with respect to said cutting edge and at least over the effective cutting length at least one further deflector surface slopes upwardly with respect to or is substantially parallel to the base surface.

Such a disposable cutting insert in accordance with the invention provides a so-called double positive rake cutting angle, i.e. both in the axial and radial directions when considered with respect to the work piece. The chip control provided by such an insert is effective over a very wide range of feed rates (chip thickness) and chip depths so as to ensure, over this wide range that the chips formed are diverted from the work piece and from the operator so as to form a spiral which tends to break at one or more half turn lengths.

The particular form and orientation of the chip deflector surfaces ensures the spiral formation of the chips and their breakage for a wide range of materials, feed rates and chip widths.

Various embodiments of replaceable indexable cutting inserts in accordance with the present invention will now be described by way of example and with reference to the accompanying drawings in which:

FIG. 1 is a plan view from above of the insert,

FIG. 2 is a partially sectioned side elevation of the insert;

FIG. 3 is a plan view on an enlarged scale of the insert shown in FIG. 1;

Figure 4:
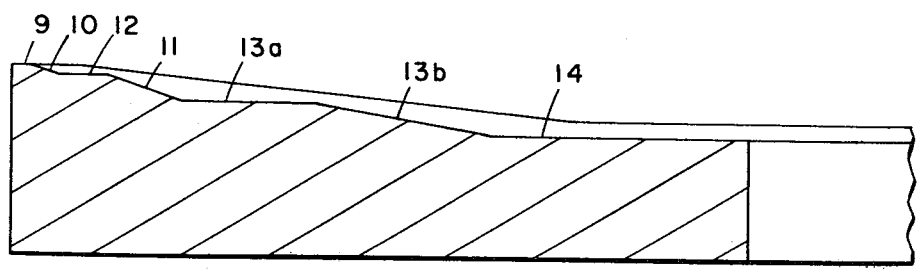
FIG. 4 is a longitudinally sectioned view of the insert shown in FIG. 3 taken along the line IV—IV.

As seen in the drawings an indexable cutting insert 1 of regular rhombic shape is formed of hard material, preferably tungsten carbide and has a central pin receiving hole 2. The insert 1 has an upper face 3 and a substantially planar base face 4 with side walls 5 perpendicular to and joining the faces 3 and 4. Curved cutting corners 6 are respectively at the intersections of the side walls 5 whilst cutting edges 7 are respectively formed at the intersections of each side wall 5 and upper face 3.

A chip control structure 8 is formed in the upper face 3 and extends continuously along the cutting edges 7 and is spaced from the cutting edges 7 by land surfaces 9.

The portion of the chip control structure 8 adjacent each cutting edge 7 comprises first and second elongated descending surfaces 10 and 11, a first elongated chip deflector surface 12 between the control surfaces 10 and 11, and further elongated chip deflector surfaces, (in the insert being described by way of example, two such surfaces 13a and 13b are shown but more may be provided) which extend between the descending surface 11 and a central portion 14 of the upper face of the insert. As can be seen, in this particular example, the further chip deflector surface 13b extends for slightly over half the cutting edge length this being the effective cutting length of the insert.

As can be seen in FIG. 2 of the drawings the cutting edge 7 (together with the associated land surface 9) slope downwardly from the cutting corner towards the base face 4, and over the effective cutting length of the cutting edge. Furthermore the land descending and deflector surfaces 9, 11 and 13 have in general a substantially downwardly directed slope with respect to the base face 4 in the direction of the cutting edge 7 and from the cutting corner at least over the effective cutting length.

The width of the land surface 9 widens continuously over the effective cutting length of the cutting edge from the cutting corner. In one characteristic example the degree of widening is such that the land surface at its widest portion is some 40% wider than the land surface at the cutting corner.

The descending surface 10 slopes downwardly from its associated land surface 9 towards the base face 4 with a variable angle of slope $\alpha$. In one characteristic example the angle of slope $\alpha$ varies from 24° to 14°. The chip deflector surface 12 is of variable width and depth with respect to the cutting edge. Thus, in one characteristic example the variations in width range from 0.2 to 0.4 whilst the variations in depth range from 0.1 to 0.2.

The descending surface 11 slopes downwardly towards the base face 4, having an angle of slope $\beta$ which differs at differing portions thereof. In one characteristic example the angle of slope $\beta$ ranges from 20° to 10°. Beyond the descending surface 11 are to be formed one or more deflector surfaces 13a, 13b which either rise with respect to the base surface, the rising angle of slope θ varying, for example, between 0° and 10° depending on the region of the cutting edge involved, the characteristic feature being that this angle reduces as one goes from the cutting corner to the centre of the insert. Alternatively, in certain regions the deflector surface 13 can be substantially parallel to the base surface, i.e. the angle θ=0.

Figure 5:
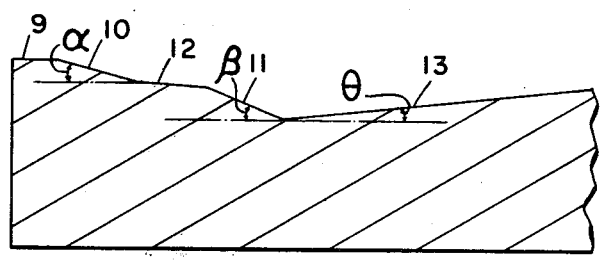
FIG. 5 is a characteristic cross-section of the insert shown in FIG. 3 taken along the line V—V.

The characteristic feature of this insert is that its upper face is formed as a stepped cavity of which the land surface is the rim and the central portion 14 is the base with all the radial sectional lines passing through the centre of the insert (for example, the sectional line IV—IV as shown in FIG. 4) constituting continuously descending section lines towards the centre of the insert whilst all the normal sectional lines perpendicular to the cutting edge as for example shown in FIG. 5, also having a continuously descending sectional form but always terminating in at least one deflector surface which is either parallel to or slopes upwardly with respect to the base surface.

Figure 6:
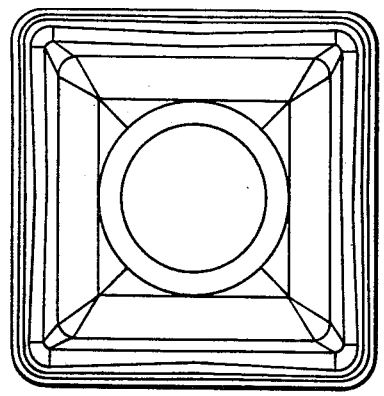
FIGS. 6, 7, 8 and 9 are respective plan views of further forms of indexable cutting inserts in accordance with the invention.
Figure 7:
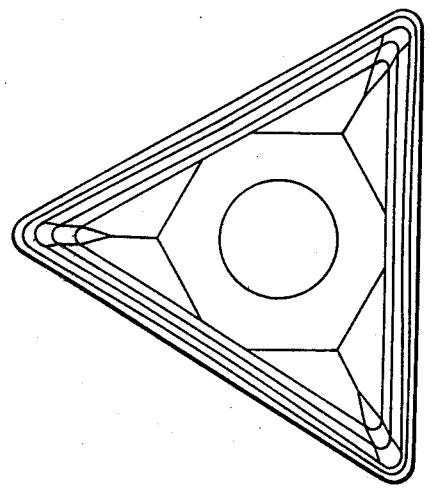

FIGS. 6 and 7 respectively illustrate indexable inserts in accordance with the present invention of respectively square and triangular shapes but having chip control structures essentially similar to those described with respect to FIGS. 1–5 (i.e. in the main having single further chip deflector surfaces).

Figure 8:
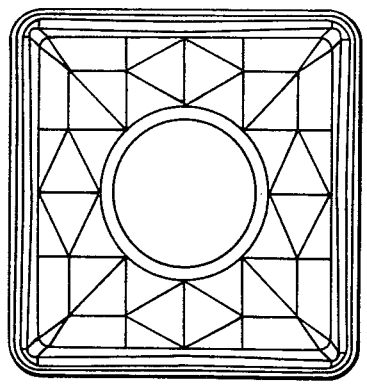
Figure 9:
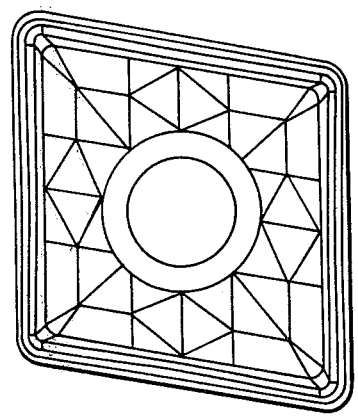

In the embodiments illustrated in FIGS. 8 and 9 of the drawings (where the inserts are respectively of square and rhombic shapes) a slightly more complex chip control structure is shown where in all cases at least two and in some cases three further deflector surfaces are provided along each effective cutting length, this contributing to the essential versatility of the insert in handling chip control over the widest range of cutting depths and feeds.

We claim:

1. A disposable cutting insert having an upper and a substantially planar base face; side walls adjoining said faces; at least one cutting edge formed at an intersection of the upper face and a side wall; at least one cutting corner formed at an intersection of an adjacent pair of side walls; a chip control structure formed in said upper face extending along the cutting edge from the cutting corner for at least an effective cutting length of the cutting edge; a land surface spacing said control structure from the cutting edge; said control structure comprising first and second descending surfaces respectively extending in the direction of said cutting edge; a first chip deflector surface between said descending surfaces and merging therewith; one or more further chip deflector surfaces extending between said second descending surface and a central portion of said upper face; said land descending and deflector surfaces having, in general, a substantially downwardly directed slope with respect to the base face in the direction of the cutting edge and from the cutting corner at least over said effective cutting length said land and first descending surfaces increasing in width from said cutting corner and at least along said effective cutting length; said first descending surface sloping with respect to said land surface by an angle which decreases from said cutting corner along said effective cutting length; said chip control structure constituting a stepped cavity of which said land surface is the rim and said central portion the base such that along every radial section line directed centrally through and in the direction of said central portion no surface is directed upwardly with respect to a preceding surface whilst along every section line directed normally with respect to said cutting edge and at least over the effective cutting length at least one further deflector surface slopes upwardly with respect to or is substantially parallel to the base surface.

2. An indexable insert according to claim 1 and being of rectangular shape and wherein a cutting edge is formed at the intersection of the upper face and each side wall.

3. An indexable insert according to claim 1 and being of triangular shape and wherein a cutting edge is formed at the intersection of the upper face and each side wall.

4. An indexable insert according to claim 1 and being of rhombic shape and wherein a cutting edge is formed at the intersection of the upper face and each side wall.

* * * * *

UNITED STATES PATENT AND TRADEMARK OFFICE
CERTIFICATE OF CORRECTION

PATENT NO. : 4367990

DATED : January 11, 1983

INVENTOR(S) : Reuven Porat, Eliezer Nessel

It is certified that error appears in the above—identified patent and that said Letters Patent is hereby corrected as shown below:

On the title page, Item [75] Inventors:

"Elizer Nessel" should read -- Eliezer Nessel --.

Signed and Sealed this

Seventeenth Day of May 1983

[SEAL]

Attest:

DONALD J. QUIGG

Attesting Officer — Acting Commissioner of Patents and Trademarks